(12) United States Patent
Borkowski et al.

(10) Patent No.: US 9,779,429 B2
(45) Date of Patent: Oct. 3, 2017

(54) CUSTOM RULE BASED DETERMINATION OF PRICING INFORMATION USING FILE WITH PREDETERMINED NAME STORED IN INSTALLATION DIRECTORY IN INSTALL PATH

(75) Inventors: Pawel J. Borkowski, Cracow (PL); Michal Klak, Zielonki (PL); Maksymilian Kowalik, Cracow (PL); Bartlomiej T. Malecki, Slomniki (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1264 days.

(21) Appl. No.: 13/608,182

(22) Filed: Sep. 10, 2012

(65) Prior Publication Data
US 2013/0159238 A1 Jun. 20, 2013

(30) Foreign Application Priority Data
Dec. 20, 2011 (EP) .................................. 11194534

(51) Int. Cl.
*G06Q 40/00* (2012.01)
*G06Q 30/02* (2012.01)

(52) U.S. Cl.
CPC ............................... *G06Q 30/0283* (2013.01)

(58) Field of Classification Search
CPC ................................................ G06Q 30/0283
USPC .......................................................... 705/52
See application file for complete search history.

(56) References Cited

U.S. PATENT DOCUMENTS

| 5,579,222 | A | * | 11/1996 | Bains | G06F 11/34 705/16 |
| 6,006,035 | A | * | 12/1999 | Nabahi | G06F 8/61 709/221 |
| 6,549,932 | B1 | * | 4/2003 | McNally | G06F 9/4862 709/202 |
| 6,993,657 | B1 | * | 1/2006 | Renner | G06F 17/30289 707/E17.005 |
| 7,644,119 | B1 | * | 1/2010 | Anooshfar | H04N 1/00212 709/203 |

(Continued)

OTHER PUBLICATIONS

Tangram to debut new web-based asset reporting as well as tracking technology for handheld PDA devices. (Jun. 26, 2000). PR Newswire Retrieved from https://dialog.proquest.com/professional/professional/docview/671362054?accountid=142257 on May 8, 2017.*

(Continued)

*Primary Examiner* — Kito R Robinson
(74) *Attorney, Agent, or Firm* — Marcia L. Doubet

(57) ABSTRACT

Determining a pricing information for an instance of an application program comprises: receiving a software discovery result for the application program instance; receiving, from a file with a predetermined name stored in an installation directory in an install path, at least one custom rule associated with an application program indicated in the software discovery result; evaluating, by a rule engine, one or more conditions of the received at least one custom rule on one or more parameter values of the received software discovery result; and in dependence on a result of the evaluation, processing the at least one custom rule, the processing comprising determining the pricing information for the application program instance.

15 Claims, 3 Drawing Sheets

(56) References Cited

U.S. PATENT DOCUMENTS

| | | | |
|---|---|---|---|
| 7,895,083 B2 | 2/2011 | Shah et al. | |
| 7,945,490 B2* | 5/2011 | Alonzo | G06Q 10/087 705/30 |
| 7,954,151 B1* | 5/2011 | Nisbet | G06F 21/554 713/154 |
| 8,095,471 B2* | 1/2012 | Yang | G06F 21/10 705/59 |
| 8,307,355 B2* | 11/2012 | Capomassi | G06Q 30/00 707/822 |
| 8,849,242 B2* | 9/2014 | Gidron | G06Q 30/04 379/127.05 |
| 2002/0138764 A1* | 9/2002 | Jacobs | G06F 21/10 726/28 |
| 2002/0169625 A1* | 11/2002 | Yang | G06F 21/10 705/59 |
| 2004/0249763 A1* | 12/2004 | Vardi | G06F 21/10 705/59 |
| 2005/0192871 A1* | 9/2005 | Galuten | G06Q 20/123 705/26.1 |
| 2006/0020939 A1* | 1/2006 | Fellenstein | G06F 9/4843 718/1 |
| 2006/0036570 A1* | 2/2006 | Schaefer | G06F 9/44505 |
| 2006/0037000 A1* | 2/2006 | Speeter | H04L 67/125 717/120 |
| 2007/0162420 A1* | 7/2007 | Ou | G06F 17/30575 |
| 2008/0021984 A1* | 1/2008 | Zarenin | H04L 41/0853 709/220 |
| 2008/0133289 A1* | 6/2008 | Armour | G06Q 10/06 705/311 |
| 2008/0209005 A1* | 8/2008 | Akamatsu | H04L 12/24 709/217 |
| 2008/0271012 A1* | 10/2008 | Eykholt | G06F 8/73 717/174 |
| 2009/0158438 A1* | 6/2009 | Pichetti | G06F 21/10 726/26 |
| 2010/0100778 A1* | 4/2010 | Sullivan | H04L 12/00 714/57 |
| 2010/0198843 A1* | 8/2010 | Sirota | G06F 8/60 707/754 |
| 2011/0055034 A1 | 3/2011 | Ferris et al. | |
| 2011/0214124 A1* | 9/2011 | Ferris | G06F 8/63 718/1 |
| 2011/0219437 A1* | 9/2011 | Ohkado | G06F 17/30 726/6 |
| 2011/0238710 A1 | 9/2011 | Barritz et al. | |
| 2011/0296401 A1* | 12/2011 | DePoy | G06F 8/60 717/174 |
| 2012/0131567 A1* | 5/2012 | Barros | G06F 9/5088 717/170 |
| 2012/0166246 A1* | 6/2012 | Simon | G06Q 10/06316 705/7.26 |
| 2013/0332303 A1* | 12/2013 | Schank | G06Q 30/0641 705/26.4 |

OTHER PUBLICATIONS

McDougall, P. (2001). IBM moves to plug holes in disaster recovery—technology and services are designed to keep business running even if an entire system fails. InformationWeek, , 26. Retrieved from https://dialog.proquest.com/professional/professional/docview/676992648?accountid=142257 on May 8, 2017.*

Dubie, D. (2006). HP to roll out new management software; company to add business-impact analysis and application-discovery software, introduces blade platform. Network World, , 8. Retrieved from https://dialog.proquest.com/professional/professional/docview/669943007?accountid=142257 on May 8, 2017.*

Anonymous, "System and Method for Software Purchase Planning", IP.com, IPCOM000212361D, published Nov. 8, 2011. 3 pages.

* cited by examiner

CUSTOM RULE BASED DETERMINATION OF PRICING INFORMATION USING FILE WITH PREDETERMINED NAME STORED IN INSTALLATION DIRECTORY IN INSTALL PATH

CROSS-REFERENCE TO RELATED APPLICATION

The present application claims priority of co-pending European patent application 11194534.1, filed on Dec. 20, 2011.

BACKGROUND

The invention relates to the field of data processing, and more particularly to the determination of pricing information using custom rules.

More and more software developing companies employed product and service customization strategies and also customized pricing strategies in order to gain greater profit and in order to increase the number of customers. Nowadays, prices for particular software may depend on the usage time, hardware resources (memory, processor, storage, network bandwidth) available for the application, the kind of customer (student, nonprofit organization, profit organization), usage type (commercial, backup, developing, production), the version of a software product, discounts, special offers, or individual contracts. The complexity and variability of modern pricing strategies is a problem for many automated software billing systems which are currently not able to cope with this complexity.

In particular, in a situation when large companies run a plurality of application programs on a plurality of processing machines, current software auditing applications (SAA) typically used by the companies are not operable to cope with the complexity of current pricing strategies. Thus, organizations using current software auditing applications for monitoring their costs—as well as cloud-based software service providers using SAAB for billing purposes—are often forced to calculate the total costs (or prices) manually, or at least they have to perform some manual corrections on automatically generated cost (or price) reports. This is not only time consuming but also error prone.

BRIEF SUMMARY

It is an objective of the invention to provide for an improved computer implemented method, computer program product, and computer system for determining pricing information for one or more instances of an application program.

In one aspect, the invention relates to a computer implemented method for determining a pricing information for an instance of an application program. The application program instance is running on a first computer system. The method comprises: receiving a software discovery result for the application program instance from a software discovery module, the received software discovery result comprising an indication of an application program from which the application program instance was instantiated and one or more values of parameters of the application program instance and/or of parameters of the first computer system; receiving, by a rule engine from a file with a predetermined name stored in an installation directory in an install path where installation files of the indicated application program are also stored, at least one custom rule associated with the application program indicated in the software discovery result, the at least one custom rule comprising one or more conditions; evaluating, by the rule engine, the one or more conditions of the received at least one custom rule on the one or more parameter values of the received software discovery result; and in dependence on a result of the evaluation, processing the at least one custom rule, the processing comprising determining the pricing information for the application program instance.

In a further aspect, the invention relates to a computer-readable storage medium comprising computer-interpretable instructions which, when executed by a processor, cause the processor to perform determining a pricing information as discussed above.

In a still further aspect, the invention relates to a computer system for determining a pricing information as discussed above.

BRIEF DESCRIPTION OF THE SEVERAL VIEWS OF THE DRAWINGS

In the following, preferred embodiments of the invention will be described in greater detail by way of example only, making reference to the drawings, in which.

In the following, like numbered elements in these figures are either similar elements or perform an equivalent function. Elements which have been discussed previously will not necessarily be discussed in later figures if the function is equivalent.

DETAILED DESCRIPTION

Figure 1:
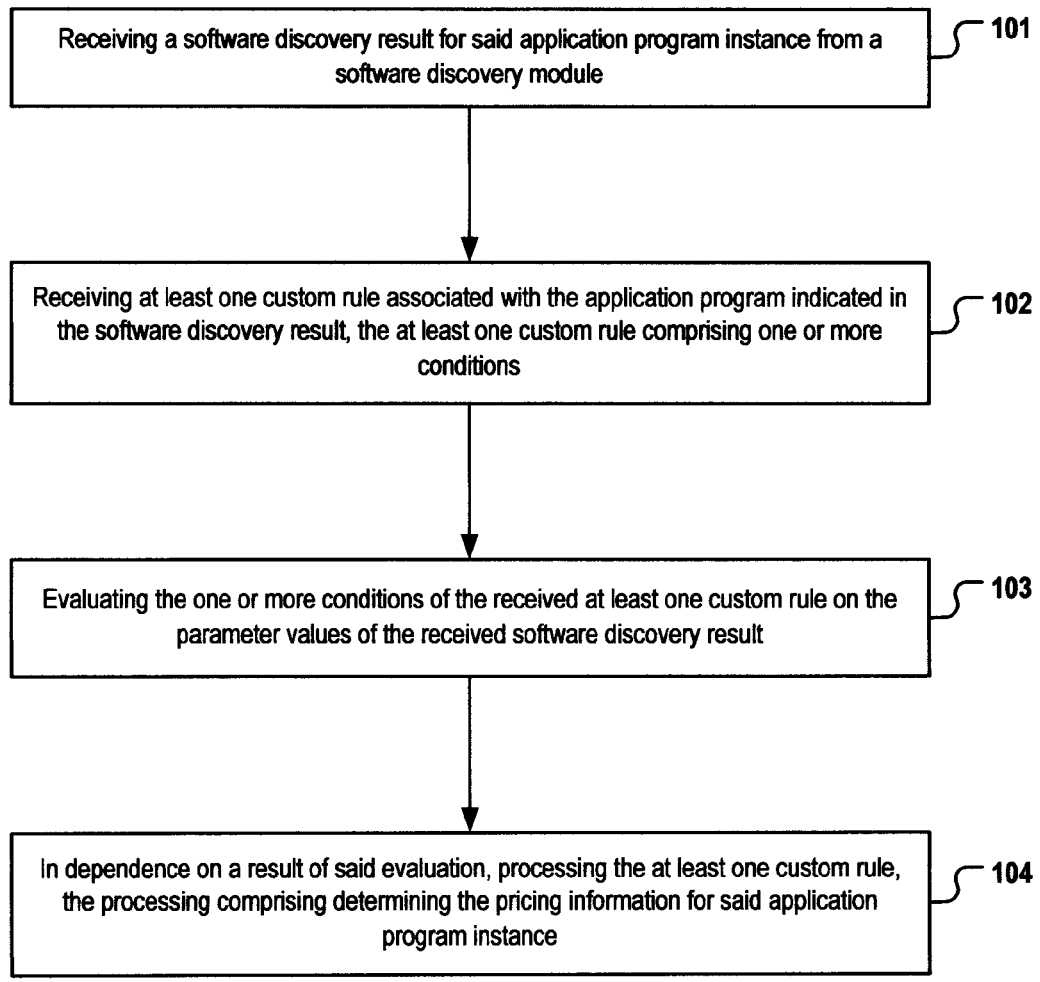
FIG. 1 is a flowchart of a method of one embodiment of the invention.

An embodiment of the present invention determines pricing information for one or more instances of an application program. Several terms used herein will now be described.

A 'rule' as used herein is a computer-interpretable statement with two parts: a conditional statement (e.g., an IF clause of an IF-THEN, IF-THEN-ELSE, or SWITCH/CASE expression) and the instruction block (which may optionally include nested conditional statements and control flow statements), whereby the instruction block is only executed in case the conditional statement is evaluated to the Boolean value 'true'.

A 'custom rule' as used herein is any rule comprising custom processing instructions and/or comprising a specification or indication of custom processing instructions for calculating a pricing information for a particular application program instance. The term 'custom' indicates that the processing instructions for calculating the pricing information may deviate from standard processing instructions for calculating that pricing information. Thus, the term 'custom' indicates that the calculation of the pricing is somehow customized, e.g., adapted for calculating a discount, a time limited pricing strategy, a usage dependent pricing strategy, or the like. Embodiments of the invention are not limited to a particular syntax of a custom rule.

A 'software discovery result' as used herein is any data received from a software discovery module and comprising an indication of an application program from which a particular application program instance was instantiated and comprising one or more parameter values of the application program instance and/or parameters of a computer system hosting the application program instance. The computer system may be, for example, a standard computer system or a cloud environment. According to embodiments, a software discovery result may comprise information about found application programs, about the computer system on which the application program is installed, and/or about a period of time for which an application program instance running on that computer system was monitored.

A 'software discovery module' as used herein is any application program or program module being operable to automatically determine which application program instances are installed and/or executed in a given environment, e.g., on a computer or cluster of computers, and to collect the software discovery results.

A 'rule engine' as used herein is any application program or program module being operable to execute a rule by evaluating the rule and its condition(s) on one or more parameter values.

An 'auditing module' as used herein is any application program or program module being operable to automatically evaluate, and optionally also report, one or more aspects of a computer system and/or the application program instances audited by the auditing module.

An 'audit computer system' as used herein, also referred to herein as an 'audit server system' or a 'second computer system', may execute an embodiment of the present invention, and may be connected to one or more first computer systems (i.e., a computer system hosting an application program instance) via a network.

The expression 'at least one custom rule associated with the application program' as used herein refers to the existence of means or manner for determining the assignment (or association) of a custom rule and an application program (e.g., a storage medium having stored an identifier of a custom rule and an identifier of the application program together, in a way that this association can be determined by the receiving rule engine). According to some preferred embodiments, the expression means that the at least one custom rule is received together in one message (e.g., as an attachment to this message) with the software discovery result gathered for an application program instance of the assigned application program.

Figure 2:
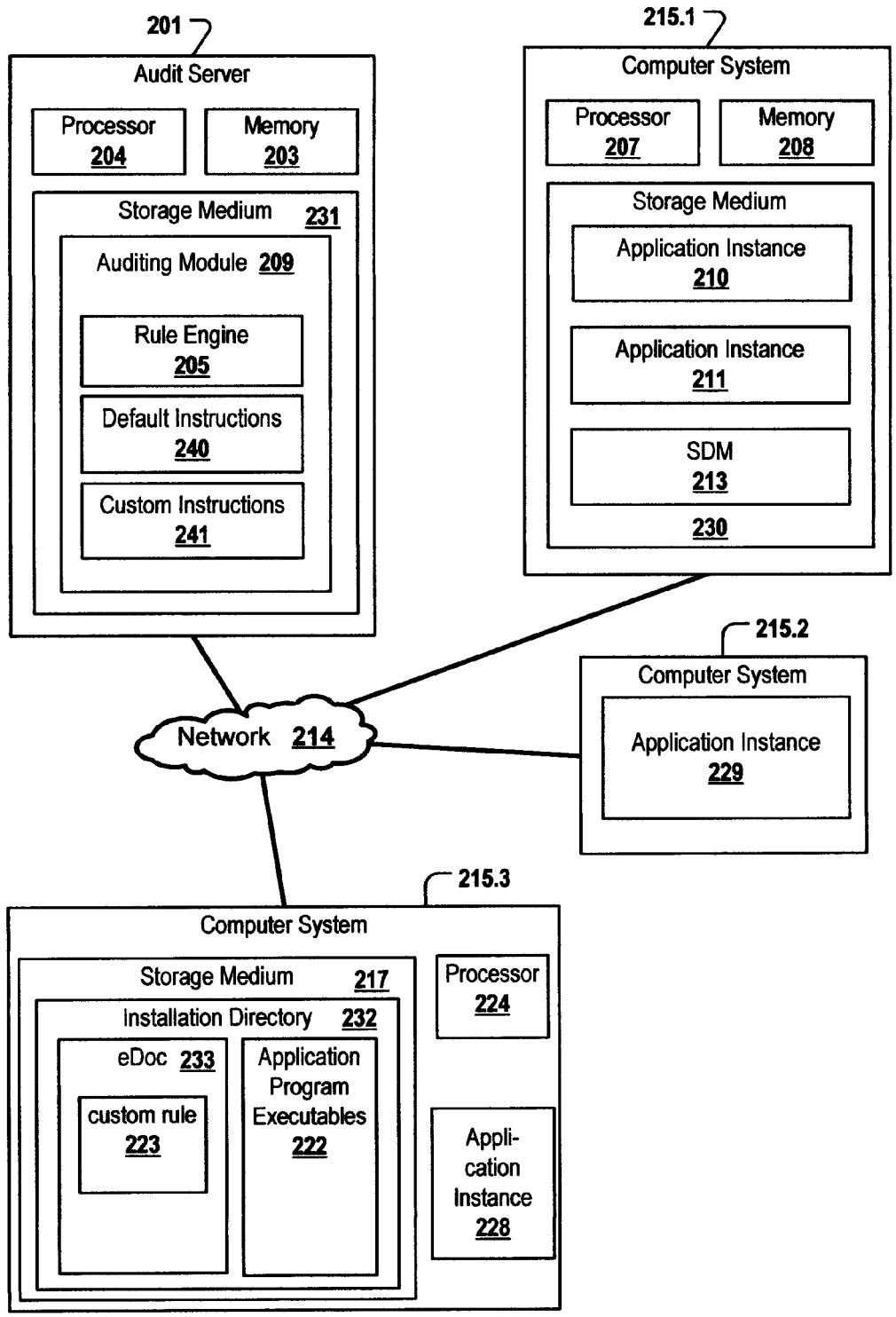
FIG. 2 is a block diagram of a distributed computer system according to another embodiment.

FIG. 1 shows some computer implemented processing steps to be executed by a rule engine running on an audit server system 201 as depicted in FIG. 2. The method comprises a first receiving step 101 for receiving a software discovery result for an application program instance running on a first computer system 215.1, 215.2, 215.3. The software discovery result is received from a software discovery module (SDM) 213. In a second receiving step 102, at least one custom rule associated with the application program indicated in the software discovery result is received by the rule engine. The at least one custom rule and the software discovery result may physically be contained within one and the same (i.e., a single) message. In an evaluation step 103, the rule engine evaluates the one or more conditions of the at least one received custom rule on parameter values being contained in the received software discovery result. In dependence on a result of the evaluation, the at least one custom rule is executed by the rule engine in step 104. The processing of the at least one custom rule at step 104 comprises determining pricing information for the application program instance.

These features may be advantageous because the software discovery result, as well as at least one associated custom rule, may be received dynamically in the form of two separately manageable—but associated—pieces of data. Several kinds of software discovery modules exist in the art, already providing automatically gathered monitoring data such as the above-discussed parameter values. Thus, by making use of software discovery systems which are already in use (i.e., which are in use for purposes other than pricing determination), and by receiving the software discovery result and also at least one custom rule associated to an application program specified in that software discovery result, a fully automated, highly dynamic price calculation method is provided which requires only minimum changes to existing legacy systems that already include a software discovery module.

According to embodiments, the at least one custom rule received at step 102 is specified according to a meta-language and/or a processing language that can be automatically processed by a software auditing program. This feature may be advantageous because it allows a seamless integration of the rule-based pricing calculation into existing legacy systems that already include an auditing module. According to embodiments, the rule engine is part of, or is operatively coupled to, the auditing module. The meta-language may be any meta-language for specifying the workflow of one or more processing tasks, e.g., ILOG® JRule from International Business Machines Corporation or the like. ("ILOG" is a registered trademark of International Business Machines Corporation in the United States, other countries, or both.)

According to embodiments, the at least one custom rule received at step 102 is received from a location comprising: a relational database; a pricing rule server; a file in a file directory where the application program indicated in the software discovery result is installed; or a location indicated by a Uniform Resource Identifier. This may be advantageous because, depending on the localization of the custom rules, the task of maintaining (i.e., creating, modifying, and/or deleting) custom rules can be centralized (using a single relational database, using a single centralized pricing rule server, or the like) or decentralized (e.g., using the installation directory of a particular application program which may be located on different first computer systems for different application programs) as needed. Thus, by choosing an appropriate location of the one or more custom rules assigned to (i.e., associated with) a particular application program, optimum rule maintenance strategy can be employed. One or more rules assigned to the same application program may be bundled within one electronic document and may be received by the rule engine from the location in one single step.

According to embodiments, the at least one custom rule is received by the rule engine as an attachment to the received software discovery result, both the at least one custom rule and the software discovery result having been submitted by the software discovery module. These features may be advantageous because the task of finding the assigned at least one custom rule is executed on the side of the software discovery module, not on the side of the rule engine. Because a pricing strategy is typically dependent on the application program and/or the hardware on which the application program is running, leaving the determination of an assigned custom rule at the side of the software discovery module, and/or the side of the host of the application programs, may facilitate the maintenance of the assignment.

According to embodiments, the at least one assigned rule is received by the rule engine running on the second computer system, also referred herein as the auditing server, by actively accessing the location upon having received the software discovery result. Preferentially, the software discovery result comprises an indication of the location. According to other embodiments, the rule engine receives the at least one assigned custom rule from the software discovery module, the software discovery module having accessed the location for sending the assigned custom rule stored therein to the rule engine. The software discovery result and the at least one assigned custom rule may be received from one of the first computer systems via a network.

According to embodiments, the application program is assigned to (i.e., associated with) the at least one custom rule in a way that the software discovery module is operable to automatically determine the assignment between a particular application program and the at least one custom rule and to send a software discovery result for a particular application program instance to the rule engine together with the at least one custom rule having been assigned to the application program from which the application program instance was instantiated. As noted earlier, the assignment can be established, for example, by storing the at least one custom rule in the installation directory of an application program, where this installation directory is accessible by the software discovery module. According to preferred embodiments, the software discovery module is operable to access the assignment in order to send the software discovery result of an application program instance, together with the at least one custom rule assigned to the application program, to the rule engine.

An example of a software discovery result is given in the following:

```
<MatchedSignature guid="089e325c18d744e992ab28c5321e9d08">
    <Metadata> <module scope="MONITORING"/> </Metadata>
    <Variable name="INSTALL_PATH" value="/opt/ipf/examples/"/>
    <Variable name="IS_INSTALLED" value="true"/>
</MatchedSignature>
```

Given the information that a particular application program is installed (i.e., "IS_INSTALLED" is set to "true", in this example), and given the installation directory being stored in the path "/opt/ipf/examples/", the rule engine according to some embodiments is operable to extract additional parameters of the application program (e.g., the product name/version/vendor of the application program) by accessing the installation directory.

According to embodiments, as illustrated by the example above, the software discovery result comprises a parameter value being indicative of a path to a directory that is accessible by the rule engine. (See the 'name="INSTALL_PATH"' attribute illustrated in the example above.) Preferentially, the directory is the installation directory of the application program for whose instance the software discovery result was gathered. The rule engine may use this path for reading the at least one assigned custom rule stored under the path, thereby receiving the at least one assigned custom rule.

More generally, according to embodiments, the association/assignment of the at least one custom rule and the application program may be implemented by: storing an identifier of the at least one custom rule and an identifier of the application program in an operating system registry; storing an identifier of the at least one custom rule in a file with a predefined name inside an installation directory of the application program; storing the identifier of the at least one custom rule and the identifier of the application program in one and the same file (i.e., together in a single file); and storing both the identifier of the at least one custom rule and the identifier of the application program in a relational database.

In case an operating system registry is used, the operating system registry may be the registry of one of the first computer systems hosting the software discovery module. The software discovery module may evaluate the operating system registry for sending the at least one custom rule, which is assigned in the registry to one of the application programs, to the rule engine together with the software discovery result.

In case an installation directory of the application program is used, the installation directory of at least some of the application programs may be located on two different first computer systems, each of the first computer system being monitored by the software discovery module (as discussed in more detail below, with reference to FIG. 2).

The parameters of the first computer system, which may be received in the software discovery result at step 101 and then evaluated at step 103, may comprise any combination of parameters specifying a property of a hardware component of the first computer system or a property of an operating system of the first computer system or of a virtual machine acting as runtime environment for the application program instance. According to embodiments, the parameters of the first computer system may comprise, in any combination: a processor vendor; a processor name; a processor model number; a maximum number of sockets per server; a processor type; a property of a virtual machine acting as runtime environment of the application program instance; a property of an operating system of the first computer system; a manufacturer of the virtual machine; a type of the virtual machine; a serial number of a hardware component of the first computer system; a size of a storage drive; a CPU frequency; an operating system version; or a derivative system parameter value having been derived from one or more of the above parameters. (Note that the above-presented list of parameters is a non-exhaustive list of examples. With the emergence of new technologies, new parameters may be used.)

An example for a derivative parameter value is a 'processor value unit' (PVU). The processor value unit is a derivative number of one or more of the above parameters and correlates with the number of processors of the first computer system hosting the application program instance.

The parameters of the application program instance, which may be received in the software discovery result at step 101 and then evaluated at step 103, may comprise any combination of parameters specifying a property of the application program instance or of the application program from which the instance was instantiated. According to embodiments, the parameters of the application program instance may comprise, in any combination: an indication of the installation status of the application program instance; an installation path; the size of the installed application program on a disc; the version of the application program; the vendor of the application program; a memory usage; a processor usage; a peak memory usage; a size of the virtual machine; an I/O load; or a derivative software instance parameter value having been derived from one or more of the above parameters. (Note that the above-presented list of parameters is a non-exhaustive list of examples.)

These features may be advantageous because they allow for automatically adapting the calculated pricing information on the hardware used for running the application program instance. For example, if a particular application program instance runs on a multicore processor system, the calculated price may be increased.

FIG. 2 shows a distributed computer system comprising an audit server 201 and three first computer systems 215.1-215.3 being connected to the audit server via a network 214. Each of the first computer systems comprises a processor 207, 224; a memory 208; and a storage medium 230, 217 (not shown in every box representing a first computer system). Also, the audit server comprises a processor 204, memory 203, and a storage medium 231. The storage medium 231 comprises computer interpretable instructions specifying an auditing module 209. The auditing module comprises a rule engine 205 and is operable to execute one or more default processing instructions 240. The one or more default processing instructions 240 are executed in case a custom rule was not received by the rule engine for a particular application program, or in case the version of the rule engine 205 or of a software discovery module 213 is not sufficient for processing a particular custom rule. The default processing instructions 240 for calculating the pricing information for a particular application program instance may also be used in case a validity period of the at least one received custom rule does not apply to the running time of the application program instance as specified in the received software discovery result.

According to embodiments, the software discovery result and the at least one custom rule are received by the auditing module 209, and the auditing module 209 is operable to execute default processing steps 240 for calculating the pricing information for the application program instance.

According to embodiments, the at least one custom rule 223 associated with the application program indicated in the software discovery result comprises a meta-language specification of the custom processing steps (see 241) to be executed by the auditing module 209 for calculating the pricing information.

According to embodiments, the custom processing instructions 241 are specified within the at least one custom rule 223 in the meta-language, the meta-language being interpretable by the auditing module 209.

In case the at least one custom rule was not received, the default processing steps (see 240) are executed to compute the pricing information. Otherwise, the custom processing steps are executed to compute the pricing information.

Specifying the custom processing steps in a meta-language executable by the auditing module 209 may be advantageous as this allows a seamless integration of the customized price calculation strategy into existing auditing application programs. Furthermore, maintaining such customized processing operations by modifying the rules is facilitated, because in general, a meta-language can be understood more easily than source code.

An auditing module 209 'operatively coupled' to the rule engine 205 is any auditing application program or auditing program module being operable to exchange data with the rule engine (e.g., for executing custom rules provided by the rule engine or other tasks.) Depending on the embodiment, the auditing module 209 and the rule engine 205 may be part of one large software management application, but may also be provided as two standalone but interoperable software applications. The rule engine 205 may likewise be a plug-in or a component of the auditing module 209.

According to embodiments, the computer system further comprises at least one software discovery module. The at least one software discovery module runs on one of the first computer systems and is adapted for: monitoring and gathering one or more values of parameters of the application program instance; monitoring and gathering one or more parameters of the first computer system on which the application program instance is running; and sending the software discovery result comprising one or more parameter values of the software instance and/or of the first computer system to the rule engine.

According to embodiments, the software discovery module and the rule engine executing the at least one received custom rule are running on different computer systems. One or more application program instances of one or more different application programs may be running on one or more first computer systems connected to a second computer system hosting the rule engine via a network. According to embodiments, the second computer system or a third computer system may host an auditing module, the auditing module being interoperable with the rule engine. These features may be advantageous because they provide a centralized instance for calculating the price of a plurality of different software application instances running on a plurality of first computer systems, which may be maintained easily.

In case the at least one custom rule was received and can be correctly processed by the current version of the rule engine and the software discovery module 213, the custom processing instructions 241 are executed by the auditing module in accordance with meta-language specifications contained in the body of the at least one received custom rule. In this case, the pricing information for the application program instance for which the software discovery result was gathered and evaluated is a result of executing the custom processing instructions 241. Computer system 215.3 hosts one or more instances 228 of an application program being installed in an installation directory 232 of storage medium 217. The installation directory comprises executables of the application program 222 and also an electronic document 233 with a custom rule 223.

The software discovery module 213 is operable to access the installation directory 232 for determining the at least one custom rule 223 having been assigned to application program 222 (where the assigning is indicated by storing the rule in the installation directory of the application program).

The software discovery module 213 executes regular scans to gather software parameters of an instance 228 of the application program 222 and/or to gather computer system parameters of the computer system 215.3 hosting the application program instance 228. The software discovery module sends a software discovery result for the application program 222 in combination with the custom rule 223 to the rule engine 205 on a regular basis.

Thus, the rule engine continually receives monitoring information and also custom rules from the software discovery module 213, whereby the operator of the auditing module 209 does not have to care about maintaining the custom rules or their assignments to application programs.

According to further embodiments, the computer system comprises a plurality of first computer systems, which each may operate a software discovery module 213 monitoring all of the application program instances running on the respective first computer system. The software discovery modules send one or more software discovery results gathered from their respective first computer system to the rule engine 205 running on the audit server 201. Alternatively, only one of the first computer systems operates a software discovery module, the software discovery module monitoring all application program instances running on any one of the first computer systems. Each of the first computer systems may be connected to the audit computer system via a network, e.g., an intranet or the Internet.

Figure 3:
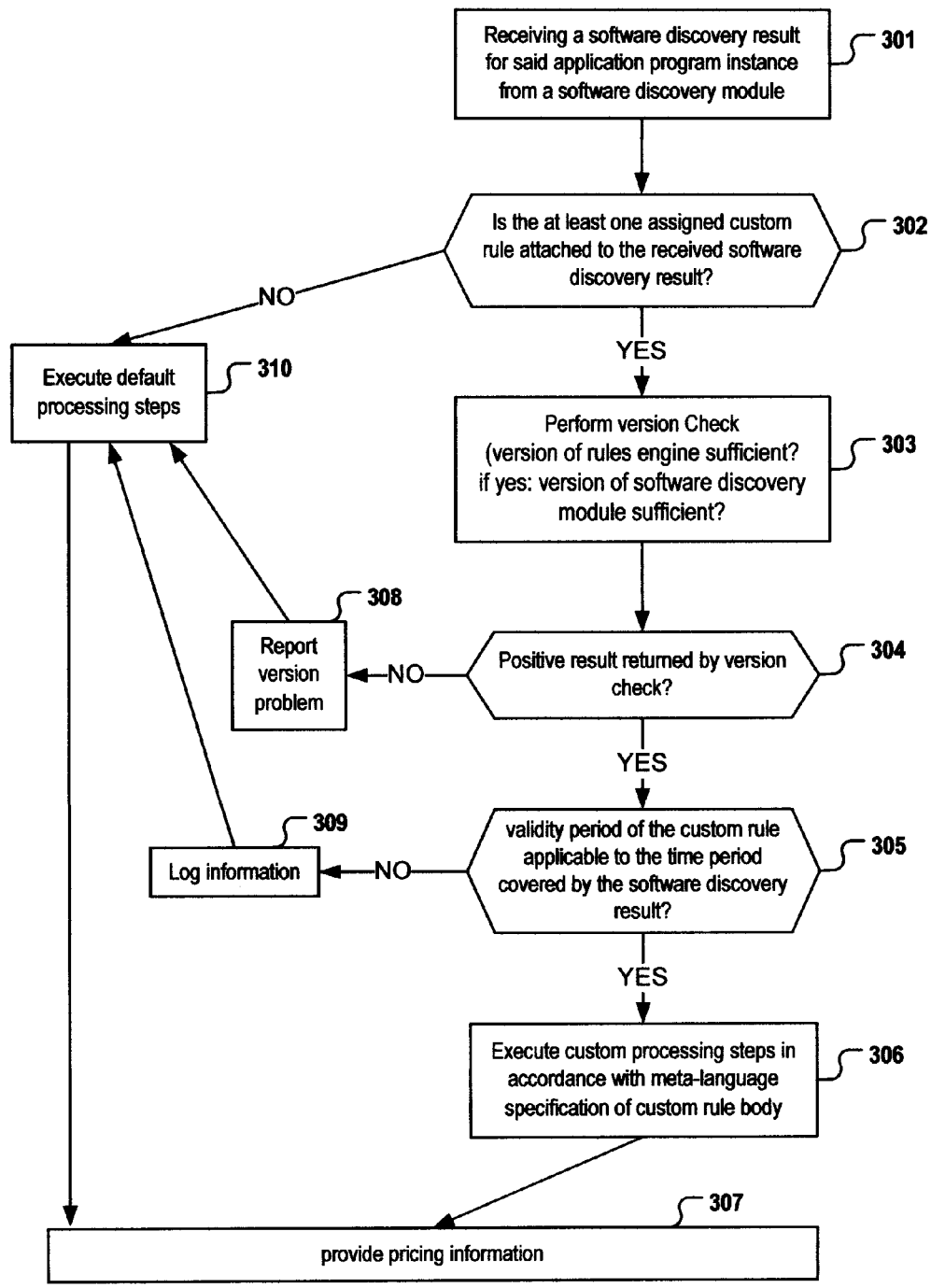
FIG. 3 is a flow chart of processing a message in another embodiment.

FIG. 3 depicts an embodiment of a method to be executed by the rule engine 205 of the audit server 201. In a first receiving step 301, a software discovery result is received for a particular application program instance from a software discovery module 213.

In a determination step 302, it is determined if the at least one assigned custom rule was attached to the received software discovery result (e.g., was contained in the same message as the software discovery result). If so, a version check is executed at step 303 to determine if the version of the rule engine is sufficient for parsing the content of the received custom rule and/or if the version of the software discovery module 213 is sufficient for gathering all parameters evaluated by the received at least one custom rule. In case no associated custom rule is received at step 302, then processing continues at step 310 with initiating the execution of default processing steps for calculating the pricing information.

The determination if the assigned at least one custom rule is received at step 302 may be executed by an auditing module comprising the rule engine or being interoperatively coupled to the rule engine.

As noted earlier, the custom processing instructions may be specified within the at least one custom rule in a meta-language, the meta-language being interpretable by the auditing module. According to embodiments, the method further comprises parsing the meta-language specification of the custom processing steps for executing the custom processing steps. Parsing is executed only in case the test at step 304 determines that the version check at step 303 returns the positive result.

The version check performed at step 303 preferably comprises: checking if the version of the rule engine is sufficient for evaluating the custom rule and/or checking if the version of the software discovery module is sufficient for collecting all parameter values evaluated by the custom rule. The version check returns a negative result in case the version of the rule engine is not sufficient, the version of the software discovery module is not sufficient, or both the version of the rule engine and of the software discovery module are not sufficient, and returns a positive result otherwise.

These features may be advantageous because the version check and executing the custom rule (see the discussion of step 306, below) only in case the version check returns a positive result avoids the calculation of an erroneous pricing information caused by using an outdated version of the rule engine or an outdated version of the software discovery module. In a further advantageous aspect, by returning an indication that the rule engine and/or the software discovery module is outdated (see the discussion of step 308, below), an operator of the distributed computer system comprising the first and the second computer systems may immediately be notified of the component (rule engine and/or software discovery module) which needs to be updated. Thus, a time consuming evaluation as to which of the components needs an update can be avoided.

More particularly, according to embodiments, the version checking based on the version of the rule engine contemplates that the at least one custom rule comprises a header and a body. The version of the at least one custom rule is specified in the header of the custom rule. Executing the version check by the rule engine comprises: reading the version of the at least one custom rule from the custom rule's header; checking whether the version of the rule engine is sufficient (which may comprise, for example, comparing the version of the custom rule with the version of the rule engine); in case the version of the rule engine is not sufficient, outputting a first message being indicative of a need to update the rule engine; and only in case the version of the rule engine is sufficient, checking whether the version of the software discovery module is sufficient.

These features may be advantageous because an operator of the auditing module and the rule engine is thus automatically informed that the rule engine is outdated and needs to be updated. Furthermore, checking whether the version of the software discovery module is sufficient is only executed in case the version of the rule engine is sufficient. This may be advantageous because therefore, an outdated rule engine shall not be used for calculating the custom price at order, thereby avoiding an erroneous price calculation. In this scenario, an additional and time consuming checking step in respect to the version of the software discovery module is avoided. This may also reduce the network traffic as the software discovery module is typically located on another computer than the auditing module. In addition, parsing the rule body by an outdated rule engine for executing a potentially erroneous software discovery version check can be avoided. According to some embodiments, the determination whether a version of the rule engine is still sufficient may be based on accessing a storage medium that stores an assignment of a list of rule engine versions that are sufficient for evaluation of one or more custom rule versions.

According to embodiments, checking whether the version of the software discovery module is sufficient comprises: determining a minimum set of parameters evaluated by the one or more conditions of the at least one custom rule by evaluating the body of the rule; computing a minimum version of the software discovery module being sufficient for gathering the minimum set of parameters; and in case the version of the software discovery module is lower than the computed minimum version, then determining that the version of the software discovery module is not sufficient, and then outputting a second message being indicative of a need to update the software discovery module.

The determination if a version of the software discovery module is sufficient may be based, for example, on accessing a storage medium having stored, for a particular software discovery module version, a list of parameters monitored by a software discovery module having that version and being provided by the module within a software discovery module result. By comparing the parameter list with the minimum parameter list computed by evaluating the rule body, it may be automatically determined if the software discovery module is outdated or not. Determining the minimum set of parameters by evaluating the body of a rule—in contrast to reading a predefined set of parameters (e.g., from a storage device)—may be advantageous because an operator creating or modifying the custom rule does not have to manually determine the versions of the software discovery module that are operable to provide all the parameter values required by a particular custom rule and to store a corresponding assignment. Rather, the operator may specify a custom rule and its conditions freely. The rule engine then automatically determines whether the parameters evaluated by the conditions within the body of a received custom rule will be provided by a particular version of a software discovery module or not.

Step 304 tests the result of the version check from step 303. If the test at step 304 has a negative result (i.e., the version check determined that the version of the rule engine or the software discovery module is not sufficient), then the cause of the version problem is reported in a reporting step 308 (e.g., an indication is returned as to whether the rule engine and/or the software discovery module caused the negative result), after which the default processing steps specified in the default processing instructions 240 are executed in step 310 for calculating the pricing information.

If the test at step 304 has a positive result (i.e., the version check determined that the versions are sufficient), then in a further decision step 305, it is determined if a validity period specified in the at least one custom rule is applicable to the time period specified in and covered by the software discovery result. If not (i.e., the at least one received custom rule is not valid for the time period specified in the software discovery result), then this information is logged in a logging step 309, after which the default processing steps in the default processing instructions 240 are executed at step 310.

According to embodiments, the software discovery result received at step 301 comprises an indication of a running time. The running time is a time period ranging from the instantiation of the application program instance to the receipt of the software discovery result. The received custom rule comprises an indication of a validity period during which the pricing information is to be calculated by custom program instructions. Accordingly, the validity period check performed at step 305 comprises: determining a period of time by which the running time exceeds the validity period; creating a copy of the software discovery result, the copy not being assigned to any one of the custom rules and being indicative of the determined period of time; executing the default processing steps for calculating a first evaluation result part, the default processing steps using the copy of the discovery result as input, the first evaluation result part comprising default pricing information calculated for the determined period of time; setting the running time of the received software discovery result to the validity period of the assigned at least one custom rule; executing the at least one custom rule on the parameter values of the received software discovery result for calculating a second evaluation result part, the second evaluation result part comprising pricing information calculated selectively for the validity period; and combining the first evaluation result part and the second evaluation result part for providing the result of the evaluation.

These features may be advantageous because they allow for making use of 'default' (also called 'standard') processing instructions already provided by various legacy systems, for example by a legacy billing system or by a functional component of a legacy auditing module for calculating a price information for running the application program instance during a first time period for which a default price calculation needs to be employed and also during a second time period for which special (i.e., customized) conditions need to be considered for calculating the price. The operator of the customized pricing strategies and the custom rules does not have to inspect or otherwise spend time on understanding how the default processing instructions are implemented. He or she also does not have to modify the existing price calculating system. By splitting a software discovery result into two parts, depending on a running time specified in the received software discovery result and depending on a validity period specified in the at least one received custom rule, it can be ensured automatically that the pricing information for the default usage of an application program instance (not covered by a validity period of a custom rule) is calculated by the default program instructions.

If the test at step 305 has a positive result (i.e., the validity period specified in the custom rule covered at least a fraction of the time period specified in the software discovery result), then at step 306 the custom processing steps specified in custom processing instructions 241 are executed, at least for the fraction of time covered by the validity period, in accordance with the meta-language specifications contained in the body of the received at least one custom rule, thereby calculating the pricing information.

Thus, depending on whether a custom rule may have been received (as tested at step 302) and/or depending on the result of a version check 303 (as tested at step 304) and a validity period check 305, the pricing information provided in step 307 may be the result of the execution of custom processing steps 241 or of the execution of default processing steps 240.

According to embodiments, the rule engine receives a plurality of software discovery results and repeats the above-mentioned processing steps for each of the received software discovery results.

According to embodiments, the first computer system is one of a plurality of first computer systems respectively hosting one or more instances of one or more application programs.

According to further embodiments, the method further comprises a step of returning an audit report (not shown in FIG. 3). The audit report comprises the result of the evaluation of the at least one received custom rule and is indicative of any deviation from a default pricing information. The audit report may be returned by the auditing module 209, e.g., via a printer or a display device. According to embodiments, the audit report is automatically generated upon having executed the at least one received custom rule, upon having executed a plurality of custom rules, or in predefined time intervals.

According to further embodiments, the at least one received custom rule used for calculating the pricing information contained in the audit report is attached to the audit report. In addition or alternatively, an indication of the at least one custom rule (e.g., in the form of a rule identifier) is attached to the audit report. According to embodiments, the audit report and the attached at least one custom rule comprise the whole history of changes applied to all custom rules used for calculating the pricing information over a period of time.

These features may be advantageous because attaching the at least one custom rule, or an indication of the custom rule, to the audit report allows an operator of the audit system to understand and to check how and why a particular pricing information was calculated for a particular application program instance.

A 'computer readable medium' may be a computer readable signal medium or a computer readable storage medium. Any combination of one or more computer readable medium(s) may be utilized. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A computer-implemented method for determining instance-specific pricing information for an instance of an application program, the application program instance executing on a first computer system, the method executing on a second computer system connected via a network to the first computer system and comprising:
   receiving, at the second computer system, a software discovery result for the application program instance from a software discovery module configured to monitor execution of the application program instance on the first computer system, the received software discovery result comprising:
      an indication of an application program from which the application program instance was instantiated; and
      one or more values of parameters of the application program instance;
   receiving, by a rule engine at the second computer system from a file with a predetermined name stored on a storage device of the first computer system in an installation directory in an install path where installation files of the indicated application program are also stored on the first computer system, at least one custom rule associated with the application program indicated in the software discovery result, the storage of the file with the predetermined name in the installation directory providing the association between the at least one custom rule and the indicated application program, the at least one custom rule comprising one or more conditions;
   evaluating, by the rule engine, the one or more conditions of the received at least one custom rule on the parameter values specified in the received software discovery result; and
   in dependence on a result of the evaluation, processing the at least one custom rule, the processing comprising determining the instance-specific pricing information for the application program instance.

2. The computer-implemented method of claim 1, further comprising:
   providing an auditing module being operatively coupled to the rule engine, wherein:
      the software discovery result and the at least one custom rule are received by the auditing module;
      the auditing module is operable to execute default processing steps for calculating the pricing information for the application program instance; and
      the at least one custom rule associated with the application program indicated in the software discovery result comprises a meta-language specification of custom processing steps to be executed by the auditing module for calculating the pricing information; and
   in case the at least one custom rule was not received by the auditing module, executing the default processing steps to compute the pricing information and otherwise, executing the custom processing steps to compute the pricing information.

3. The computer-implemented method of claim 1, further comprising:
   determining, upon receipt of the software discovery result, if at least one custom rule associated with the software discovery result is received;
   in case no associated custom rule is received, initiating execution of default processing steps for calculating the pricing information;
   in case the at least one associated custom rule is received, executing a version check, the version check comprising at least one of:
      checking if a version of the rule engine is sufficient for evaluating the custom rule; and
      checking if a version of the software discovery module is sufficient for collecting all parameter values evaluated by the custom rule, wherein:
         the version check returns a negative result if the version of the rule engine is not sufficient, the version of the software discovery module is not sufficient, or both the version of the rule engine and of the software discovery module are not sufficient; and
         the version check returns a positive result otherwise;
   in case the at least one associated custom rule is received and the version check returns a positive result, executing the evaluating of the one or more conditions; and
   in case the at least one associated custom rule is received and the version check returns a negative result, returning an indication of the rule engine, the software discovery module, or both as having caused the negative result.

4. The computer-implemented method of claim 3, further comprising returning an audit report, the audit report comprising the result of the evaluation, the result being indicative of any deviation from a default pricing information.

5. The computer-implemented method of claim 4, further comprising attaching the received at least one custom rule or an indication thereof to the audit report.

6. The computer-implemented method of claim 3, wherein:
   the received software discovery result comprises an indication of a running time, the running time being a time period elapsed from an instantiation of the application program instance to the receipt of the software discovery result;
   the received custom rule comprises an indication of a validity period during which the pricing information is to be calculated by custom program instructions; and
   the method further comprises:
      in case the at least one associated custom rule is received, executing a validity period check, the validity period check comprising:
         determining a period of time by which the running time exceeds the validity period;
         creating a copy of the software discovery result, the copy not being assigned to any one of the custom rules, the copy being indicative of the determined period of time;
         executing the default processing steps for calculating a first evaluation result part, the default processing steps using the copy of the software discovery result as input, the first evaluation result part comprising default pricing information calculated for the determined period of time;
         setting the running time of the received software discovery result to the validity period of the assigned at least one custom rule;

executing the at least one custom rule on the parameter values of the received software discovery result for calculating a second evaluation result part, the second evaluation result part comprising pricing information calculated selectively for the validity period; and combining the first evaluation result part and the second evaluation result part for providing the result of the evaluation.

7. The computer-implemented method of claim 3, wherein:

the at least one custom rule comprises a header and a body;

a version of the at least one custom rule is specified in the header of the custom rule; and executing the version check comprises:

reading the version of the at least one custom rule from the header of the custom rule prior to the checking if the version of the rule engine is sufficient for evaluating the custom rule;

in case the version of the rule engine is not sufficient for evaluating the custom rule, outputting a first message being indicative of a need to update the rule engine; and only in case the version of the rule engine is sufficient for evaluating the custom rule, checking if the version of the software discovery module is sufficient for the collecting.

8. The computer-implemented method of claim 7, wherein checking if the version of the software discovery module is sufficient comprises:

determining a minimum set of parameters evaluated by the one or more conditions of the at least one custom rule by evaluating the body of the rule;

computing a minimum version of the software discovery module being sufficient for gathering the determined minimum set of parameters; and in case the version of the software discovery module is lower than the computed minimum version, then determining that the version of the software discovery module is not sufficient and further outputting a second message being indicative of a need to update the software discovery module.

9. The computer-implemented method of claim 3, the method further comprising:

parsing the meta-language specification of the custom processing steps for executing the custom processing steps, wherein the parsing is executed only in case the version check returns the positive result.

10. The computer-implemented method of claim 1, the first computer system being one of a plurality of computer systems respectively hosting one or more instances of one or more application programs.

11. The computer-implemented method of claim 3, wherein checking if the version of the rule engine is sufficient comprises comparing the version of the custom rule with a version of the rule engine.

12. The computer-implemented method of claim 1, wherein the software discovery module accesses the file with the predetermined name location to determine the at least one custom rule.

13. A non-transitory computer-readable storage medium comprising computer-interpretable instructions which, when executed by a processor of a second computer system connected via a network to a first computer system, cause the processor to determine instance-specific pricing information for an instance of an application program, the application program instance executing on the first computer system, by performing:

receiving, at the second computer system, a software discovery result for the application program instance from a software discovery module configured to monitor execution of the application program instance on the first computer system, the received software discovery result comprising:

an indication of an application program from which the application program instance was instantiated; and one or more values of parameters of the application program instance;

retrieving, by a rule engine at the second computer system from a file with a predefined name stored on a storage device of the first computer system in an installation directory in an install path where installation files of the indicated application program are also stored on the first computer system, an identifier of at least one custom rule associated with the indicated application program, the storage of the file with the predefined name in the installation directory providing the association between the at least one custom rule and the indicated application program, the at least one custom rule comprising one or more conditions;

receiving, by the rule engine, the identified at least one custom rule;

evaluating, by the rule engine, the one or more conditions of the received at least one custom rule on the parameter values specified in the received software discovery result; and in dependence on a result of the evaluation, processing the at least one custom rule, the processing comprising determining the instance-specific pricing information for the application program instance.

14. A system for determining instance-specific pricing information for an instance of an application program, the system comprising:

an audit server hosting a rule engine, the audit server executing on a second computer system and being connected via a network to one or more first computer systems, the first computer systems respectively hosting one or more application program instances;

wherein the rule engine is adapted for:

receiving, at the second computer system, a software discovery result for a selected one of the application program instances from a software discovery module configured to monitor execution of the application program instances on the first computer systems, the application program instances executing on one or more of the first computer systems, the received software discovery result comprising:

an indication of an application program from which the selected application program instance was instantiated; and one or more values of parameters of the selected application program instance;

retrieve, by the rule engine from a file with a predefined name stored on a storage device of a selected one of the first computer systems in an installation directory in an install path where installation files of the indicated application program are also stored on the selected first computer system, an identifier of at least one custom rule associated with the indicated application program, the storage of the file with the predefined name in the installation directory providing the association between the at least one custom rule and the indicated application program, the at least one custom rule comprising one or more conditions;

receiving, by the rule engine, the identified at least one custom rule;

evaluating, by the rule engine, the one or more conditions of the received at least one custom rule on the parameter values specified in the received software discovery result; and in dependence on a result of the evaluation, processing the at least one custom rule, the processing comprising determining the instance-specific pricing information for the selected application program instance.

15. The system of claim 14, further comprising:

at least one software discovery module, the at least one software discovery module running on one of the first computer systems, the at least one software discovery module being adapted for:

monitoring and gathering one or more values of parameters of the selected application program instance;

monitoring and gathering one or more parameters of the one or more of the first computer systems on which the selected application program instance is running; and sending the software discovery result comprising one or more parameter values of the selected application program instance and of the one or more of the first computer systems to the rule engine.

\* \* \* \* \*